US010811837B2

(12) United States Patent
Goodno

(10) Patent No.: US 10,811,837 B2
(45) Date of Patent: Oct. 20, 2020

(54) AM/FM SEED FOR NONLINEAR SPECTRALLY COMPRESSED FIBER AMPLIFIER

(71) Applicant: NORTHROP GRUMMAN SYSTEMS CORPORATION, Falls Church, VA (US)

(72) Inventor: Gregory D. Goodno, Los Angeles, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 424 days.

(21) Appl. No.: 15/845,761

(22) Filed: Dec. 18, 2017

(65) Prior Publication Data
US 2019/0190225 A1 Jun. 20, 2019

(51) Int. Cl.
*H01S 3/067* (2006.01)
*H01S 3/10* (2006.01)
*H01S 3/13* (2006.01)
*H01S 3/00* (2006.01)
(Continued)

(52) U.S. Cl.
CPC ........ *H01S 3/06754* (2013.01); *H01S 3/0057* (2013.01); *H01S 3/1003* (2013.01); *H01S 3/10084* (2013.01); *H01S 3/1306* (2013.01); *H01S 3/005* (2013.01); *H01S 3/0085* (2013.01); *H01S 3/0092* (2013.01);
(Continued)

(58) Field of Classification Search
CPC .. H01S 3/06754; H01S 3/0057; H01S 3/1003; H01S 3/10084; H01S 3/1306; H01S 2301/03
See application file for complete search history.

(56) References Cited

U.S. PATENT DOCUMENTS 5,515,196 A   5/1996   Kitajima et al.
8,830,566 B2 * 9/2014   Rothenberg ........ H01S 3/06754
                                                  359/341.1
(Continued)

FOREIGN PATENT DOCUMENTS

WO   2011053816 A1   5/2011

OTHER PUBLICATIONS

PCT International Search Report of the International Searching Authority dated Nov. 18, 2019 and dated Nov. 25, 2019 for International Application No. PCT/US2019/040082 filed Nov. 20, 2018.

*Primary Examiner* — Eric L Bolda
(74) *Attorney, Agent, or Firm* — Shumaker, Loop & Kendrick, LLP; John A. Miller

(57) ABSTRACT

A fiber amplifier system including an optical source providing an optical seed beam and an FM electro-optic modulator (EOM) that frequency modulates the seed beam to broaden its spectral linewidth. The system also includes an AM EOM that modulates the seed beam to provide an amplitude modulated seed beam that is synchronized with the frequency modulated seed beam. The system also includes a non-linear fiber amplifier receiving the AM and FM modulated seed beam, wherein the amplitude modulated seed beam causes self-phase modulation in the fiber amplifier that phase modulates the seed beam as it is being amplified by the fiber amplifier that acts to cancel the spectral linewidth broadening caused by the frequency modulation.

20 Claims, 4 Drawing Sheets

(51) Int. Cl.
*H01S 3/22* (2006.01)
*H01S 3/23* (2006.01)
(52) U.S. Cl.
CPC ......... *H01S 3/10053* (2013.01); *H01S 3/2383* (2013.01); *H01S 2301/03* (2013.01)

(56) References Cited

U.S. PATENT DOCUMENTS

| | | | |
|---|---|---|---|
| 9,036,252 B1 * | 5/2015 | Goodno | H01S 3/06754 359/341.3 |
| 2007/0201880 A1 | 8/2007 | Nicholson | |
| 2010/0128744 A1 | 5/2010 | Deladurantaye et al. | |

* cited by examiner

AM/FM SEED FOR NONLINEAR SPECTRALLY COMPRESSED FIBER AMPLIFIER

GOVERNMENT CLAUSE

This invention was made with Government support under Contract No. FA9451-18-C-0101 awarded by the Air Force Research Laboratory. The Government has certain rights in this invention.

BACKGROUND

Field

This disclosure relates generally to a fiber laser amplifier having high power and narrow linewidth and, more particularly, to a fiber laser amplifier system including an electro-optical modulator (EOM) that applies a frequency modulation (FM) signal to a seed beam to broaden its linewidth and applies an amplitude modulation (AM) signal to the seed beam that is synchronized with the FM signal, where the modulated seed beam is amplified by a non-linear fiber amplifier so that self-phase modulation that phase modulates the seed beam as it propagates through the amplifier cancels the frequency modulation of the beam to recover the spectrum of the original seed beam.

Discussion

High power laser amplifiers have many applications, including industrial, commercial, military, etc. Designers of laser amplifiers are continuously investigating ways to increase the power of the laser amplifier for these and other applications. One known type of laser amplifier is a fiber laser amplifier that employs a doped fiber that receives a seed beam and a pump beam that amplifies the seed beam and generates the high power laser beam, where the fiber has an active core diameter of about 10-20 µm or larger.

Improvements in fiber laser amplifier designs have increased the output power of the fiber to approach its practical power and beam quality limit. To further increase the output power of a fiber amplifier some fiber laser systems employ multiple fiber laser amplifiers that combine the amplified beams in some fashion to generate higher powers. A design challenge for fiber laser amplifier systems of this type is to combine the beams from a plurality of fiber amplifiers in a manner so that the beams provide a single beam output such that the beam can be focused to a small focal spot. Focusing the combined beam to a small spot at a long distance (far-field) defines the quality of the beam.

In one known multiple fiber amplifier design, a master oscillator (MO) generates a seed beam that is split into a plurality of fiber seed beams each having a common wavelength, where each fiber beam is amplified. The amplified fiber seed beams are then collimated and directed to a diffractive optical element (DOE) that combines the coherent fiber beams into a single output beam. The DOE has a periodic structure formed into the element so that when the individual fiber beams each having a slightly different angular direction are redirected by the periodic structure all of the beams diffract from the DOE in the same direction. Each fiber beam is provided to a phase modulator that controls the phase of the beam so that the phase of all the fiber beams is maintained coherent. However, limitations on bandwidth and phasing errors limits the number of fiber beams that can be coherently combined, thus limiting the output power of the laser.

In another known multiple fiber amplifier design, a plurality of master oscillators (MOs) generate a plurality of fiber seed beams at a plurality of wavelengths, where each fiber seed beam is amplified. The amplified fiber seed beams are then collimated and directed to a diffraction grating, or other wavelength-selective element, that combines the different wavelength fiber beams into a single output beam. The diffraction grating has a periodic structure formed into the element so that when the individual fiber beams each having a slightly different wavelength and angular direction are redirected by the periodic structure all of the beams diffract from the diffraction grating in the same direction. However, limitations on bandwidth limit the number of fiber beams that can be wavelength-combined, thus limiting the output power of the laser.

To overcome these limitations and further increase the laser beam power, multiple master oscillators can be provided to generate seed beams at different wavelengths, where each of the individual wavelength seed beams is split into a number of fiber seed beams and where each group of fiber seed beams has the same wavelength and are mutually coherent. Each group of the coherent fiber seed beams at a respective wavelength are first coherently combined by a DOE, and then each group of coherently combined beams are directed to a spectral beam combination (SBC) grating at slightly different angles that diffracts the beams in the same direction as a single combined beam of multiple wavelengths. The SBC grating also includes a periodic structure for combining the beams at the different wavelengths.

It is often desirable that the output beam from a fiber amplifier be narrow linewidth, i.e., have a narrow frequency range, to improve beam quality. However, providing both high power and narrow linewidth has heretofore been challenging in the art because they are typically incompatible with each other because higher power typically requires a broader beam linewidth. More particularly, the phenomenon of stimulated Brillouin scattering (SBS), i.e., non-linear back-scattering of the beam as it propagates along the fiber amplifier, increases at narrower linewidths with small frequency ranges, which acts to reduce beam power. However, the wider the beam linewidth, the more difficult it is to coherently combine or spectrally combine beams from multiple fibers into a single beam through known beam combining techniques. Particularly, dispersion effects from an SBC grating require that the linewidth of the beams being amplified is narrow, where spectral dispersion causes the spectral components of the beam to be diffracted at different angles. In other words, for SBC, the spectral brightness of the seed beam directly limits the theoretical brightness of the combined beam output.

For coherent beam combining (CBC), the spectral brightness of the seed beam limits the combining efficiency because of imperfect matching of group delay and dispersion between amplifiers. Typically, the source spectral brightness is limited by SBS, and the seed beam source to the fiber amplifier must be frequency modulated to reduce the peak SBS gain and achieve the desired output power. The frequency modulation spectral broadening limits the attainable spectral brightness from a single fiber amplifier, thus limiting the system output.

In order to overcome these limitations, designers of fiber amplifiers typically employ one or more phase modulators before the amplification stage in the fiber amplifier to reduce the linewidth through frequency modulation. However, once the frequency modulation is applied to the beam before it is amplified by the fiber amplifier, that widening of the spectral content of the beam is carried through the amplifier resulting in a low spectral brightness amplified beam.

U.S. Pat. No. 9,036,252 titled, Nonlinear Spectrally Narrowed Fiber Amplifier, issued May 19, 2015 to Goodno et al., assigned to the assignee of this application and herein incorporated by reference, discloses a fiber laser amplifier system that has high power and narrow linewidth for improved spectral brightness. The fiber amplifier system disclosed in the '252 patent includes a seed source providing an optical seed beam and a harmonic phase modulator that receives the seed beam and an RF drive signal so as to frequency modulate the seed beam using the drive signal to remove optical power from a main band or zeroth-order frequency of the seed beam and put the power into sideband frequencies separated by the frequency of the drive signal. A dispersion element receives the frequency modulated seed beam and provides temporal amplitude modulation of the seed beam. A non-linear fiber amplifier receives the frequency and amplitude modulated seed beam from the dispersion element and amplifies the seed beam, where the frequency modulation and self-phase modulation (SPM) caused by the non-linearity of the fiber amplifier combine to remove the optical power from the sideband frequencies and put it back into the zeroth-order frequency.

As generally discussed above, the '252 fiber amplifier system frequency modulates the seed beam and then uses dispersion to amplitude modulate the frequency modulated seed beam, where the amplitude modulation drives self-phase modulation caused by the non-linearity of the fiber amplifier to cause the spectrum of the beam as it is being amplified to be reduced to create the high power output beam having a narrow linewidth. Although this technique can effectively provide a high power and narrow linewidth beam as described, relying on dispersion to provide amplitude modulation of the seed beam is limited because the amplitude modulation is not precisely matched to the frequency modulation, which limits the efficiency of non-linear spectral compression in the fiber amplifier at higher modulation depths. More particularly, for low modulation depths and high non-linear fiber amplifiers the spectral compression in the fiber amplifier is effective. However, for lower amounts of non-linearity in the fiber amplifier, more dispersion is required to obtain deeper amplitude modulation of the beam. But, for larger amounts of dispersion the shape in time of the amplitude modulation does not precisely match the shape in time of the frequency modulation linewidth broadening, i.e., the amplitude modulation waveform is not perfectly sinusoidal, and thus the non-linear spectral compression will be inefficient and significant power will remain in the sidebands, which limits the amount the linewidth can be reduced. Therefore, there is a tradeoff between the spectral compression efficiency and higher SBS suppression.

DETAILED DESCRIPTION OF THE EMBODIMENTS

The following discussion of the embodiments of the disclosure directed to a fiber laser amplifier that provides frequency modulation and amplitude modulation of a seed beam to increase beam power and reduce beam linewidth is merely exemplary in nature, and is in no way intended to limit the disclosure or its applications or uses.

As discussed above, fiber laser amplifiers are limited in spectral brightness because of the incompatibility between high power and narrow linewidth. In order to overcome this incompatibility, the present disclosure proposes employing both frequency modulation and amplitude modulation to broaden the linewidth of a seed beam and then using self-phase modulation created by the non-linearity in the high power fiber amplifier to spectrally compress the linewidth of the amplified beam to near that of the original un-broadened seed spectrum.

Figure 1:
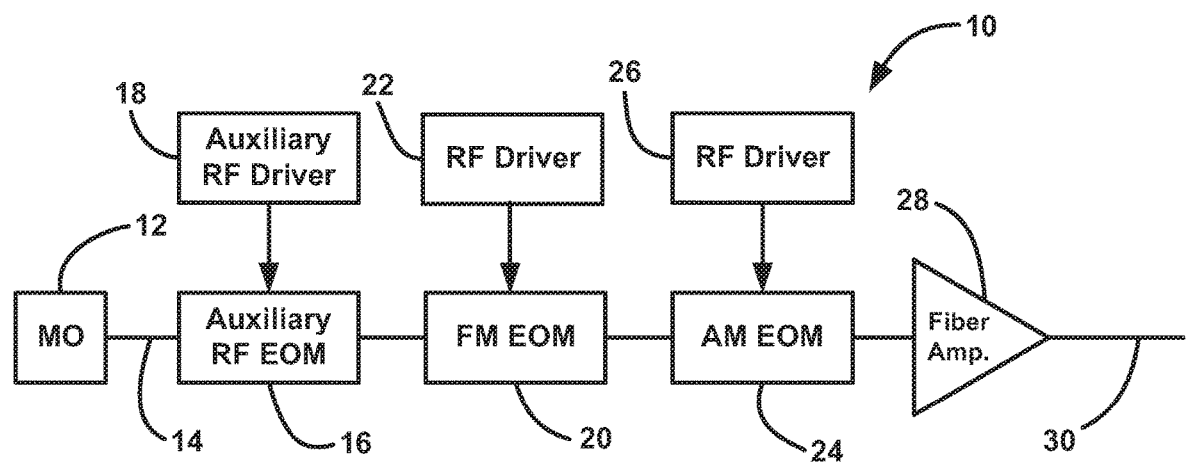
FIG. 1 is a schematic block diagram of an input portion of a fiber laser amplifier system including separate EOMs for providing frequency modulation and amplitude modulation of a seed beam.

FIG. 1 is a schematic block diagram of a portion of a fiber laser amplifier system 10 that includes a master oscillator 12 that generates a seed beam on line 14 having a particular wavelength. The seed beam is provided to an auxiliary RF electro-optical modulator (EOM) 16 that is controlled by an auxiliary RF driver 18 to provide frequency modulation. The frequency modulation provided by the EOM 16 presents a conventional technique for providing frequency modulation broadening, such as white noise or pseudo-random bit sequence (PRBS), and may not be required or desired in some amplifier systems. It is noted that the EOM 16 can be at any suitable location in the system 10 before the seed beam is amplified. The laser field $E_1(t)$ following the auxiliary EOM 16 will be of the form:

$$E_1(t)=\exp[i\phi(t)]. \quad (1)$$

As can be seen from equation (1), the laser field amplitude is constant in time and its phase is time-varying with the function $\phi(t)$ imposed by the EOM 16.

The modulated seed beam from the EOM 16 is then sent to an FM EOM 20 that also receives a RF drive signal $f(t)$ from an RF driver 22. The EOM 20 imposes the RF drive signal onto the phase of the optical seed beam to vary the frequency of the seed beam in time and provide the frequency modulation. The frequency modulated field output from the EOM 20 is of the form:

$$E_2(t)=E_1(t)e^{i\beta f(t)}, \quad (2)$$

where the drive signal $f(t)$ is assumed to be zero-mean (time-averaged), and normalized to unity, and $\beta$ is a frequency modulation depth in radians.

The frequency modulation provides a time dependent change in the phase of the seed beam that broadens the beam's linewidth, where the broad linewidth provides SBS suppression. In one non-limiting example for discussion purposes herein, the RF drive signal provided by the driver 22 is a single-tone sinusoidal signal f(t)=sin($\omega_m$t), where $\omega_m$/2π is a modulation frequency that could 32 GHz, which is twice the Stokes frequency shift caused by SBS in a fused silica fiber. However, it is noted that other high frequency sinusoidal drive signals can also be employed in various applications. More generally, the drive signal f(t) need not be sinusoidal and can in fact be of any functional form, including for example, a PRBS format, or a shaped noise spectrum.

The frequency modulation provided by the EOM 20 generates an optical seed beam that includes broadened spectral linewidth that is defined by the functional form f(t) and modulation depth β of the drive signal. In the non-limiting example described herein, the spectral content of the seed beam will include frequency sidebands separated by 32 GHz. The modulation depth β of the RF drive signal from the driver 22 is selected depending on the desired spectral linewidth, where a higher modulation depth signal would generate a broader linewidth. For example, in the non-limiting described example herein, the modulation depth β of the drive signal may be selected to remove all of the power from the zeroth-order frequency of the seed beam in the EOM 20. Alternately, the modulation depth β of the drive signal may be selected to create equal amplitude powers in the zeroth and +/− first order sideband frequencies of the seed beam in the EOM 20. Alternately, the modulation depth β of the drive signal may be selected to create a large number of sidebands of the seed beam in the EOM 20.

The frequency modulated seed beam is then sent to an AM EOM 24 that receives an RF drive signal from an RF driver 26 that provides amplitude modulation of the seed beam, i.e., varies the power of the seed beam in time, where the EOM 24 imposes the drive signal onto the amplitude of the optical seed beam to provide the amplitude modulation. The RF driver 26 is synchronized with the RF driver 22 via the common underlying drive signal f(t) so as to produce an AM/FM field output from the EOM 24 of the form:

$$E_3(t) = \sqrt{1 - \frac{\beta}{B}f(t)} \quad (3)$$

$$E_2(t) = \sqrt{1 - \frac{\beta}{B}f(t)}\, e^{i\beta f(t)} E_1(t),$$

where the parameter B is a non-linear phase shift (in radians) due to self-phase modulation that is associated with the fiber amplifier 28 that will be seeded by the AM/FM source, i.e., the amplified high power beam emitted from the fiber amplifier 28 will experience a nonlinear phase shift of parameter B.

Without the frequency modulation, the amplitude modulation $$\sqrt{1 - \frac{\beta}{B}f(t)}$$

of the seed beam would provide very little broadening of the seed beam linewidth. As is apparent from inspection of equation (3), the amplitude modulation is synchronized with the frequency modulation so that peaks of the amplitude align with valleys of the phase. Because the EOM 24 directly provides amplitude modulation of the beam and does not rely on dispersion to provide amplitude modulation as in the '252 patent, the amplitude modulation term $$\sqrt{1 - \frac{\beta}{B}f(t)}$$

and the frequency modulation term $e^{i\beta f(t)}$ can be precisely matched even at high modulation depths β and/or low amplifier non-linearity B.

Figure 2:
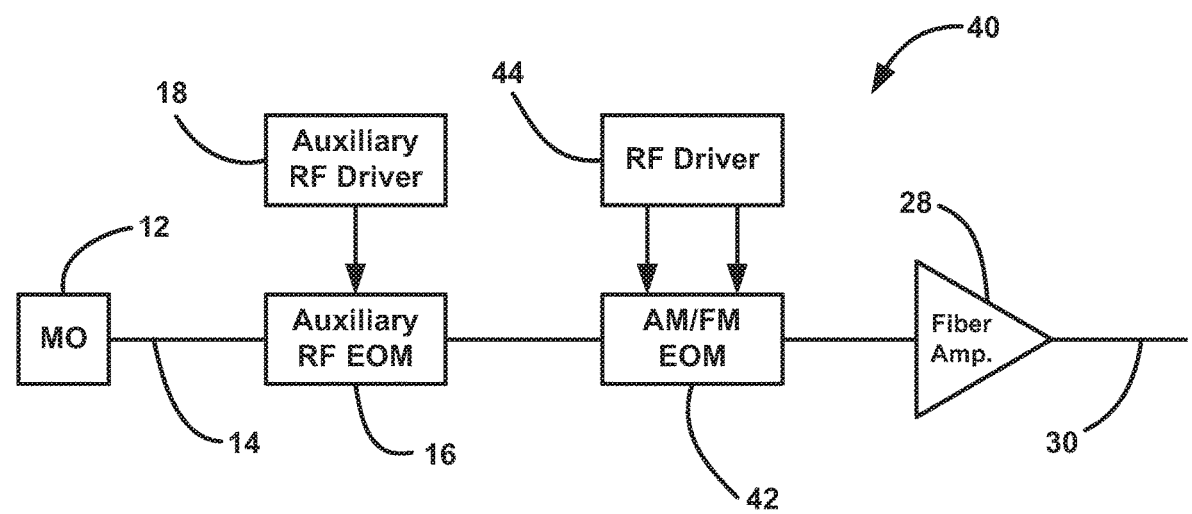
FIG. 2 is a schematic block diagram of an input portion of a fiber laser amplifier system including a single EOM for providing both frequency modulation and amplitude modulation of a seed beam.

It is also apparent from equation (3) that it is not necessary that the frequency modulation of the seed beam occur before the amplitude modulation of the seed beam, where the order of the EOMs 20 and 24 can be switched. Further, the FM and AM EOMs 20 and 24 can be combined as a single device. This embodiment is illustrated by fiber amplifier system 40 in FIG. 2, where like elements to the system 10 are identified by the same reference number. In the system 40 the EOMs 20 and 24 are combined as a single AM/FM EOM 42 that receives synchronized drive signals from an RF driver 44 and imposes amplitude modulation and frequency modulation on the seed beam at the same time. The EOM 42 can be any device suitable for the purposes described herein, such as the commercially available broadband, low-loss, LiNbO$_3$ electro-optic dual-drive Mach-Zehnder interferometric intensity modulator available from EOspace™.

The amplitude and frequency modulated seed beam is then sent to a non-linear fiber amplifier 28, which may be a plurality of fiber amplification stages each including a pump beam and a length of doped fiber, such as a ytterbium (Yb) doped length of fiber having a 10-20 μm core, and the amplified output beam is provided on fiber 30. The amplitude modulation and the frequency modulation are synchronized per equation (3) so that for a given non-linearity parameter B of the fiber amplifier 28 an optimal spectral compression of the amplified beam can be provided for high power and narrow linewidth. The combined amplitude modulated and frequency modulated seed beam is tailored to the non-linearity of the fiber amplifier 28 so that the spectral linewidth is broad when the seed beam is sent to the amplifier 28. Because of the non-linear Kerr effect in the fiber amplifier 28, where the power-dependent refractive index of the fiber causes greater phase shifts in the optical beam at higher power, the interaction of the amplitude modulated power variations in the seed beam creates synchronous phase shifts of the beam in the fiber amplifier 28. The time-dependent non-linear phase that arises due to this self phase modulation is:

$$SPM(t) = B|E_3(t)|^2 = B\left[1 - \frac{\beta}{B}f(t)\right] = B - \beta f(t). \quad (4)$$

Consequently, the amplified field emitted from the fiber amplifier 28 is:

$$E_4(t) = E_3(t)e^{iSPM(t)} \quad (5)$$

$$= \sqrt{1 - \frac{\beta}{B}f(t)}\, e^{i\beta f(t)} e^{i[B-\beta f(t)]} E_1(t)$$

$$= \sqrt{1 - \frac{\beta}{B}f(t)}\, e^{iB} E_1(t).$$

Equation (5) shows that the phase shift SPM(t) that occurs due to the non-linear self-phase modulation cancels the frequency modulation βf(t) that was previously provided from the EOM 20. The only remaining phase term is a constant global phase shift B that does not affect the optical spectrum. As the seed beam propagates through the fiber amplifier 28 and is amplified, the non-linear Kerr effect causes self-phase modulation in the amplifier 28 that causes power of the beam to shift back to the original linewidth associated with the field $E_1(t)$ so as to provide a high power beam with a narrow linewidth at the fiber amplifier output.

By cancelling the frequency modulation in the optical signal through this effect, the spectrum of the original beam $E_1(t)$ can be nearly perfectly recovered at the output of the amplifier 28, with only a small amount of linewidth broadening arising from the residual amplitude modulation term $$\sqrt{1 - \frac{\beta}{B} f(t)}.$$

The change in the spectrum between the input and output of the amplifier 28 (fields $E_3(t)$ and $E_4(t)$, respectively) reduces the spectral overlap of backscattered SBS from different locations in the length of the fiber amplifier 28. This increases the SBS threshold in comparison to a seed spectrum without modulation. In other words, as a result of there being broader spectral linewidth of the seed beam represented by field $E_3(t)$ when the seed beam is frequency modulated there is reduced back-scattering of light that is spectrally overlapped with the linewidth of the amplified beam represented by field $E_4(t)$. As the optical power is spectrally compressed by accumulated self-phase modulation as the beam propagates through the fiber amplifier 28, the SBS increases, but it is limited by the reduction of the spectral brightness earlier in the beam propagation.

As discussed, the seed beam is initially modulated to broaden its spectral linewidth and the power is spectrally compressed into the original linewidth associated with the field $E_1(t)$ as the seed beam is amplified and the non-linear phase accumulates. The back-scattered SBS Stokes light from any point in the fiber amplifier 28 will be representative of the local spectrum at that point. Since the forward propagating beam through much of the fiber amplifier 28 has very low spectral overlap with the return wave back-scattered near the output end of the fiber amplifier 28, the SBS gain will be much lower than without the AM/FM modulation. This increases the threshold for SBS and enables a higher spectral brightness output than conventional techniques for frequency modulation without self-phase modulation compression. Moreover, for the non-limiting case of sinusoidal modulation, a judicious choice of the modulation frequency to be twice the SBS Stokes shift, i.e., 32 GHz, largely can eliminate self-seeding effects from reducing the SBS threshold.

To ensure maximum compression efficiency into the original spectral linewidth associated with the input field $E_1(t)$, the magnitude of the amplitude modulation can be adjusted to be in accordance with the optimized value $$\sqrt{1 - \frac{\beta}{B} f(t)}$$

described by equation (3). This adjustment can be performed by either changing the modulation depth of the amplitude modulation drive voltage, or adding a passive delivery fiber after the amplifier 28, which increases the B-integral, or by changing the power of the amplifier 28, which proportionately changes the B-integral.

An example set of modulation parameters that are useful for illustrating SBS suppression are described below. The fiber amplifier 28 can be a 2 kW fiber amplifier with a typical B-integral of B=10 radians. The modulation RF drive signal is chosen to be $f(t)=\sin(\omega_m t)$, where $\omega_m/2\pi=32$ GHz. By selecting a frequency modulation depth β=2.4 radians, the spectral linewidth of the FM field $E_2(t)$ is broadened to ~2 $\beta\omega_m/2\pi=150$ GHz. The EOM 24 imposes synchronous amplitude modulation as described by equation (3), so that the AM/FM field is:

$$E_3(t) = \sqrt{1-0.24*\sin(\omega_m t)} e^{2.4i*\sin(\omega_m t)} E_1(t). \quad (6)$$

The resulting power fluctuations are sinusoidal with ~48% peak-to-peak modulation depth relative to the unmodulated continuous wave power level. Upon amplification in the non-linear fiber amplifier 28, the accumulated SPM cancels the imposed frequency modulation so that the output field is simply:

$$E_4(t) = \sqrt{1-0.24*\sin(\omega_m t)} e^{10i} E_1(t). \quad (7)$$

The spectral linewidth of the amplified output field is very similar to that of the original input field $E_1(t)$. Calculations show that due to the reduced spectral brightness of the seed beam over much of the length of the fiber amplifier 28, the expected SBS threshold for this AM/FM configuration should be increased by a factor of ~2× compared to the un-modulated case. This enables ~2× higher spectral brightness output power than can be otherwise attained.

The fiber laser amplifier systems 10 and 40 discussed above can be part of any suitable fiber amplifier system, where those skilled in the art would understand how the various components would be arranged consistent with the discussion herein. For example, if the fiber amplifier system 10 or 40 is part of a coherent beam combining (CBC) fiber amplifier system comprising multiple parallel fiber amplifiers 28 with identical (matched) B-integrals, the frequency modulated seed beam would be split after the EOM 24 or 42 into multiple channels. Each channel would also include a phase actuator. If the fiber amplifiers 28 in each channel were not identically matched in B-integral, then the seed beam would be split between the EOM 16 and the EOM 20 or 42 and components downstream of the EOM 16 would be duplicated for each channel. If the fiber amplifier system 10 or 40 is part of a spectral beam combining (SBC) fiber amplifier system, then there would be several of the fiber amplifier systems 10 or 40, each operating at different wavelengths and having no common components. These fiber amplifier systems are further discussed below.

Figure 3:
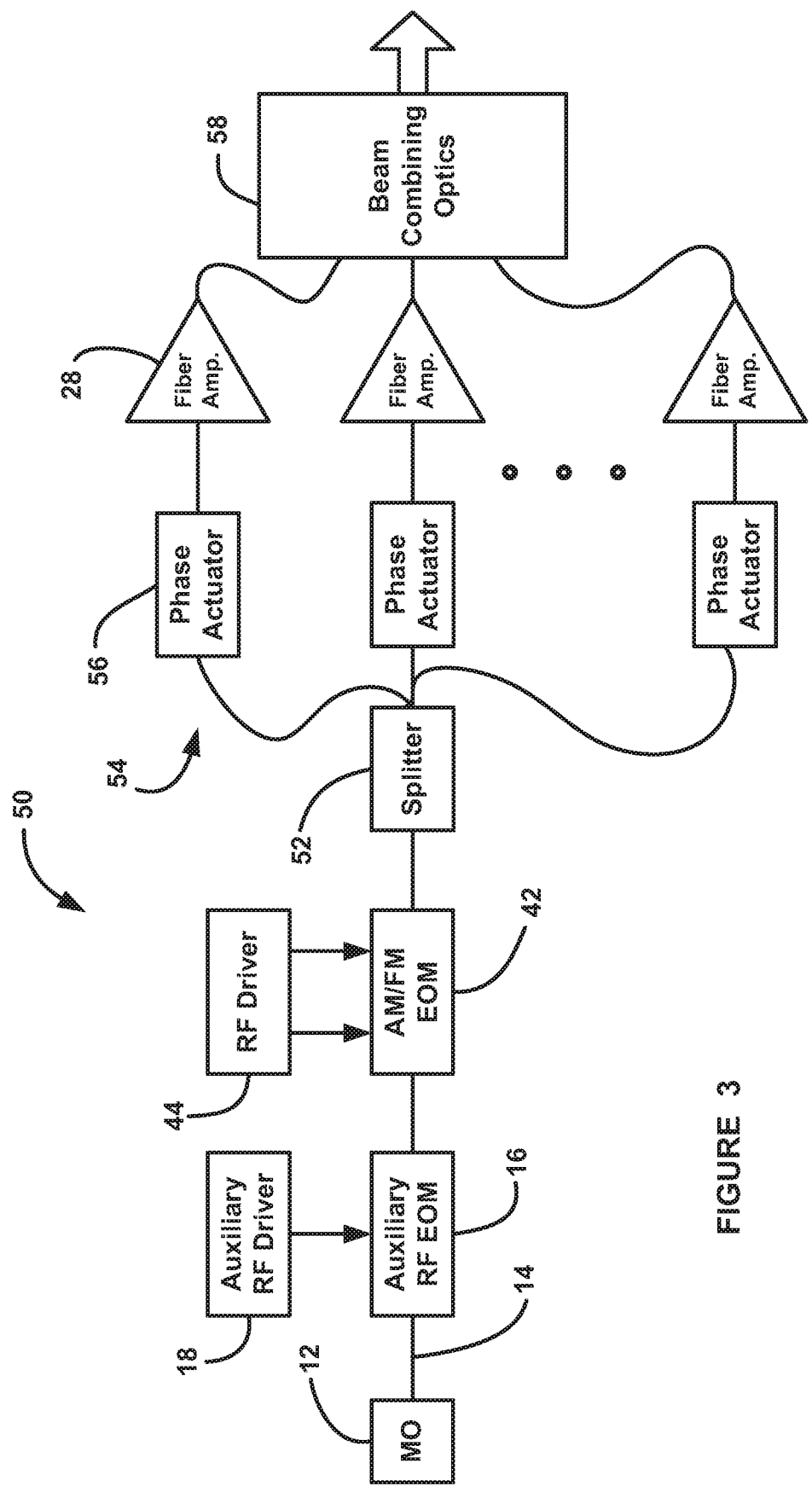
FIG. 3 is a schematic block diagram of a fiber laser amplifier system including a single EOM for providing both frequency modulation and amplitude modulation of a seed beam and employing CBC having matched B integrals between the fiber amplifiers.

FIG. 3 is a schematic block diagram of a fiber laser amplifier system 50 that includes a single EOM for providing both frequency modulation and amplitude modulation of a seed beam similar to the system 40, where like elements are identified by the same reference number, and employs CBC having matched B integrals between the fiber amplifiers 28. The system 50 includes a beam splitter 52 after the EOM 42 that splits the modulated seed beam into a plurality of channels 54. The modulated seed beam in each of the channels 54 is sent to a phase actuator 56 that controls the phase of the modulated seed beams in each of the channels 54 so that they are in phase with each other. The phase controlled and modulated seed beams are then amplified by the amplifier 28 in each channel 54 and the amplified beams are combined by beam combining optics 58 that includes the proper optics and gratings for CBC of beams having a common wavelength, and a combined beam is output therefrom.

Figure 4:
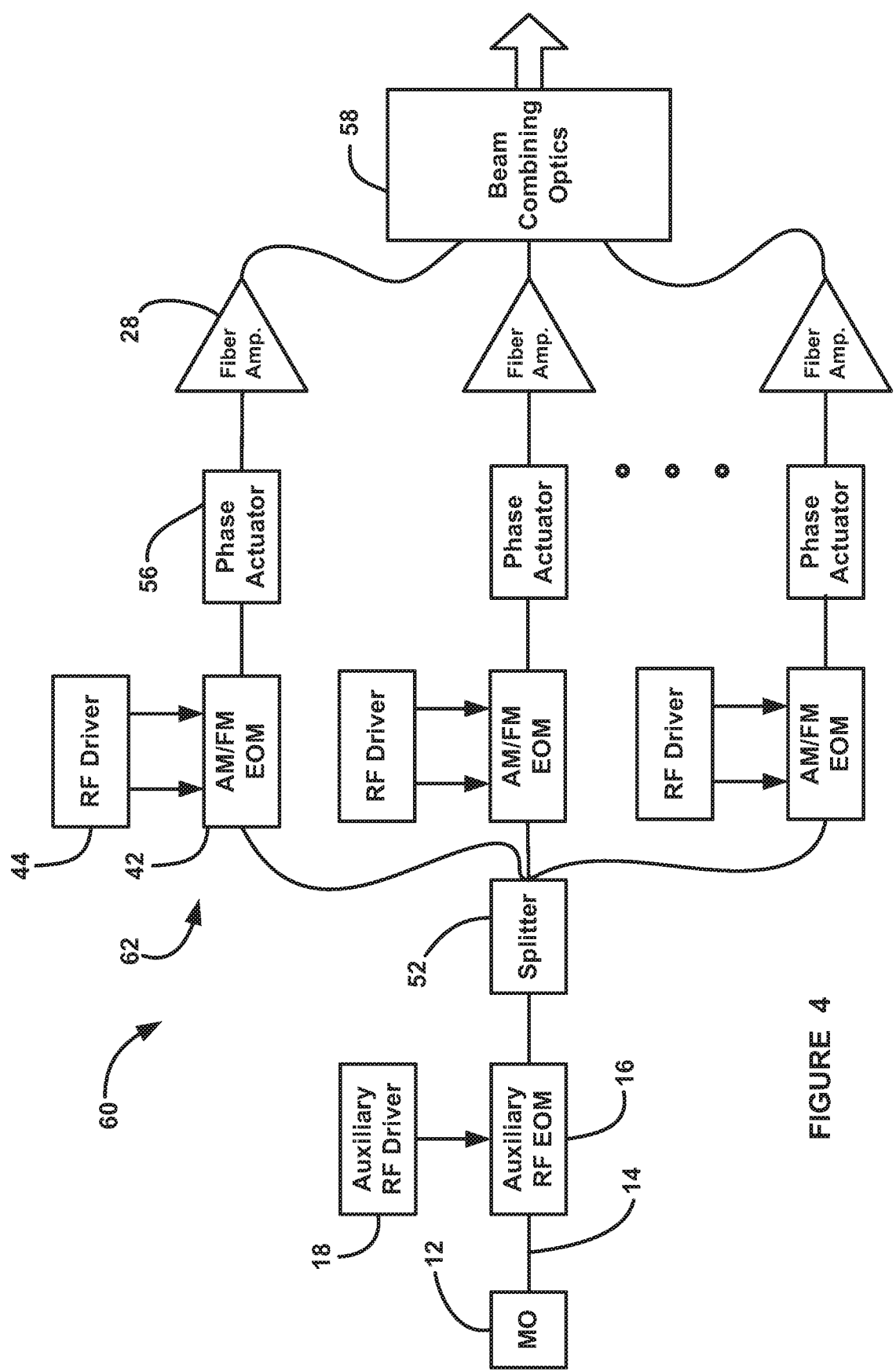
FIG. 4 is a schematic block diagram of a fiber laser amplifier system including a single EOM for providing both frequency modulation and amplitude modulation of a seed beam and employing CBC having unmatched B integrals between the fiber amplifiers.

FIG. 4 is a schematic block diagram of a fiber laser amplifier system 60 that includes a single EOM for providing both frequency modulation and amplitude modulation of a seed beam similar to the systems 40 and 50, where like elements are identified by the same reference number, and employs CBC having unmatched B integrals between the fiber amplifiers 28. The system 60 includes a beam splitter 52 that splits the seed beam prior to being modulated by the EOM 42, where the split seed beams are sent to a plurality of channels 62. The split beam in each of the channels 62 is sent to the EOM 42 for that channel 62 and the modulated seed beam is sent to the phase actuator 56 that controls the phase of the modulated seed beams in each of the channels 54 so that they are in phase with each other. The phase controlled and modulated seed beams are then amplified by the amplifier 28 in each channel 54 and then the amplified beams are combined by the beam combining optics 58 to be output therefrom as a combined beam.

Figure 5:
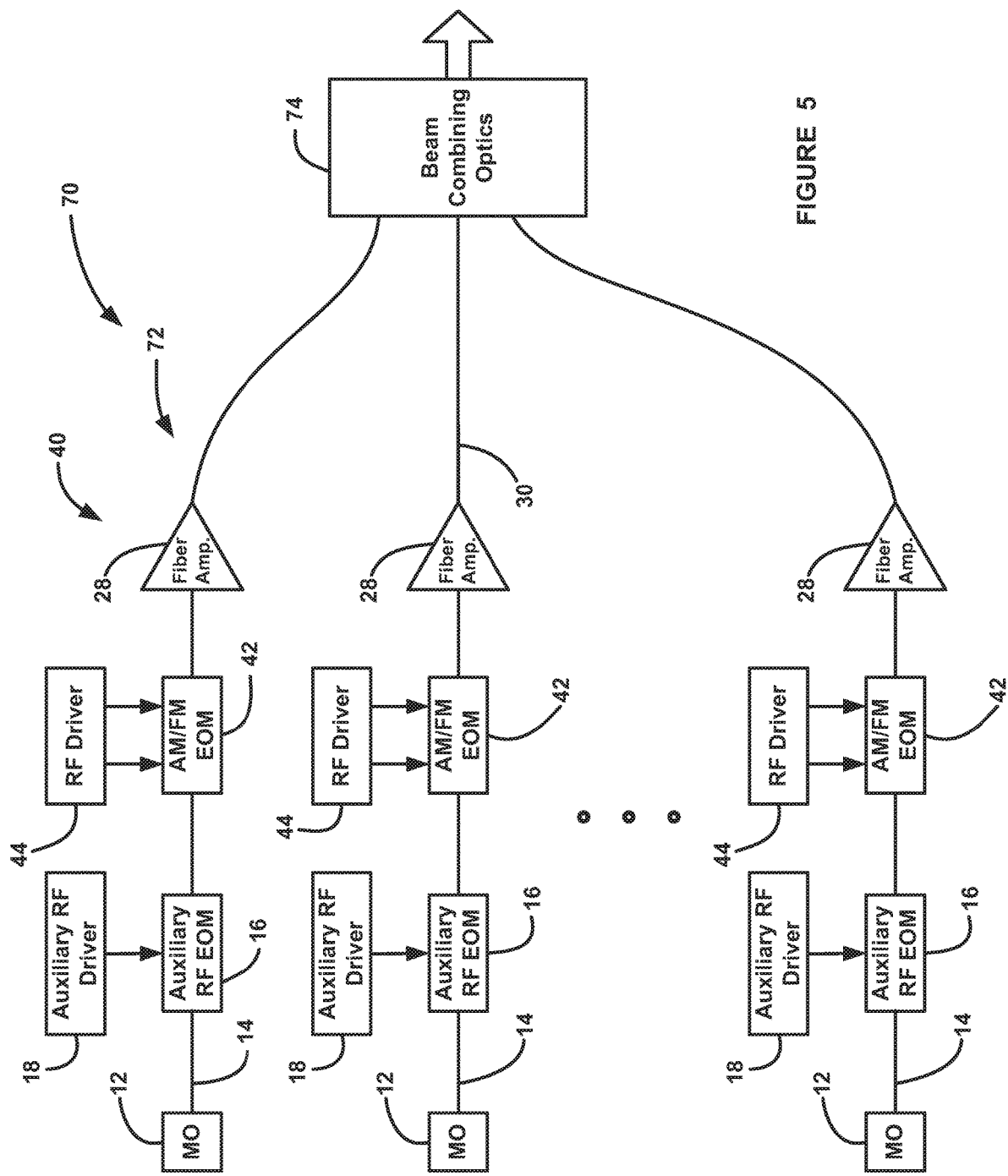
FIG. 5 is a schematic block diagram of a fiber laser amplifier system including multiple channels each having a single EOM for providing both frequency modulation and amplitude modulation of a seed beam and employing SBC.

FIG. 5 is a schematic block diagram of a fiber laser amplifier system 70 including multiple channels 72 each having one of the laser amplifier systems 40 and 50, where like elements are identified by the same reference number, and where each MO 12 in each channel 72 operates at a separate wavelength suitable for SBC. The amplified beams from the amplifiers 28 in each channel 72 are combined by beam combining optics 74 that employs the proper gratings and optics for SBC of beams having different wavelengths to generate a combined beam.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A fiber amplifier system comprising:
   an optical source providing an optical seed beam;
   a frequency modulation (FM) electro-optic modulator (EOM) responsive to the seed beam and a first RF drive signal, said FM EOM frequency modulating the seed beam using the first drive signal so as to broaden its spectral linewidth;
   an amplitude modulation (AM) EOM responsive to the seed beam and a second RF drive signal, said AM EOM amplitude modulating the seed beam using the second drive signal so as to provide an amplitude modulated seed beam that is synchronized with the frequency modulated seed beam; and
   a non-linear fiber amplifier receiving the AM and FM modulated seed beam and amplifying the seed beam, wherein the amplitude modulated seed beam causes self-phase modulation in the fiber amplifier that phase modulates the seed beam as it is being amplified by the fiber amplifier that acts to cancel the spectral linewidth broadening caused by the FM EOM.

2. The system according to claim 1 wherein the FM EOM and the AM EOM are separate modulation devices.

3. The system according to claim 1 wherein the FM EOM and the AM EOM are a single combined modulation device.

4. The system according to claim 3 where the second drive signal is a variation of the first drive signal that has been phase shifted and amplified for the amplitude modulation.

5. The system according to claim 1 wherein the first drive signal and second drive signals are single-tone sinusoid signals.

6. The system according to claim 5 wherein the amplitude of the first drive signal is selected to remove most of the power from the zeroth-order frequency of the seed beam by the FM EOM.

7. The system according to claim 5 wherein the amplitude of the first drive signal is selected to create equal amplitude powers in the zeroth and +/− first order frequencies of the seed beam by the FM EOM.

8. The system according to claim 5 wherein the first drive signal has a frequency of 32 GHz.

9. The system according to claim 1 further comprising an auxiliary EOM that frequency modulates the seed beam to provide frequency modulation broadening.

10. The system according to claim 1 wherein the optical source is a master oscillator.

11. The system according to claim 1 wherein the fiber amplifier system is part of a coherent beam combining (CBC) fiber amplifier system or a spectral beam combining (SBC) fiber amplifier system.

12. A fiber amplifier system comprising:
    an optical source providing an optical seed beam;
    an auxiliary electro-optic modulator (EOM) that frequency modulates the seed beam to provide frequency modulation broadening;
    a combined frequency modulation (FM) and amplitude modulation (AM) EOM responsive to the seed beam, a first RF drive signal and a second RF drive signal, said FM and AM EOM frequency modulating the seed beam using the first drive signal so as to broaden its spectral linewidth and amplitude modulating the seed beam using the second drive signal so as to provide an amplitude modulated seed beam that is synchronized with the frequency modulated seed beam; and
    a non-linear fiber amplifier receiving the AM and FM modulated seed beam and amplifying the seed beam, wherein the amplitude modulated seed beam causes self-phase modulation in the fiber amplifier that phase modulates the seed beam as it is being amplified by the fiber amplifier that acts to cancel the spectral linewidth broadening caused by the FM and AM EOM.

13. The system according to claim 12 where the second drive signal is a variation of the first drive signal that has been phase shifted and amplified for the amplitude modulation.

14. The system according to claim 12 wherein the first drive signal and second drive signals are single-tone sinusoid signals.

15. The system according to claim 14 wherein the amplitude of the first drive signal is selected to remove most of the power from the zeroth-order frequency of the seed beam by the FM and AM EOM.

16. The system according to claim 14 wherein the amplitude of the first drive signal is selected to create equal amplitude powers in the zeroth and +/− first order frequencies of the seed beam in the FM and AM EOM.

17. A method for amplifying an optical seed beam, said method comprising:
    frequency modulating the seed beam using a first RF drive signal so as to broaden its spectral linewidth;

amplitude modulating the seed beam using a second RF drive signal so as to provide an amplitude modulated seed beam that is synchronized with the frequency modulated seed beam; and amplifying the frequency and amplitude modulated seed beam in a non-linear fiber amplifier so that the amplitude modulated seed beam causes self-phase modulation caused in the fiber amplifier that phase modulates the seed beam as it is being amplified by the fiber amplifier that acts to cancel the spectral linewidth caused by the frequency modulation.

18. The method according to claim 17 wherein the first drive signal and second drive signals are single-tone sinusoid signals.

19. The method according to claim 18 wherein the amplitude of the first drive signal is selected to remove most of the power from the zeroth-order frequency of the seed beam during the frequency modulation.

20. The method according to claim 18 wherein the amplitude of the first drive signal is selected to create equal amplitude powers in the zeroth and +/− first order frequencies of the seed beam during the frequency modulation.

* * * * *